US012567975B2

(12) United States Patent
Li et al.

(10) Patent No.: US 12,567,975 B2
(45) Date of Patent: Mar. 3, 2026

(54) DYNAMICALLY TRACEABLE PRIVACY-PRESERVING DISTRIBUTED THRESHOLD SIGNATURE SYSTEM AND METHOD

(71) Applicant: HEFEI UNIVERSITY OF TECHNOLOGY, Anhui (CN)

(72) Inventors: Meng Li, Anhui (CN); Mingwei Zhang, Anhui (CN); Hanni Ding, Anhui (CN)

(73) Assignee: HEFEI UNIVERSITY OF TECHNOLOGY, Anhui (CN)

( * ) Notice: Subject to any disclaimer, the term of this patent is extended or adjusted under 35 U.S.C. 154(b) by 130 days.

(21) Appl. No.: 18/582,670

(22) Filed: Feb. 21, 2024

(65) Prior Publication Data

US 2024/0396738 A1 Nov. 28, 2024

(30) Foreign Application Priority Data

May 23, 2023 (CN) ......................... 202310585847.X

(51) Int. Cl.
*H04L 9/32* (2006.01)
*H04L 9/08* (2006.01)

(52) U.S. Cl.
CPC .......... *H04L 9/3247* (2013.01); *H04L 9/0825* (2013.01); *H04L 9/0869* (2013.01); *H04L 9/3213* (2013.01)

(58) Field of Classification Search
None
See application file for complete search history.

(56) References Cited

U.S. PATENT DOCUMENTS

| | | | | |
|---|---|---|---|---|
| 12,056,370 B2 * | 8/2024 | Chen | ...................... | G06F 3/0655 |
| 2018/0005186 A1 * | 1/2018 | Hunn | .................... | G06F 16/219 |
| 2021/0050990 A1 * | 2/2021 | Hearn | ................... | G06F 16/184 |
| 2021/0081935 A1 * | 3/2021 | Faulkner | ........... | G06Q 20/3674 |

OTHER PUBLICATIONS

Meng Li et al., "Decentralized Threshold Signatures with Dynamically Private Accountability", arXiv:2304.07937v1, Apr. 2023, pp. 1-23.
Office Action of China Counterpart Application, with English translation thereof, issued on Jun. 11, 2025, pp. 1-20.

* cited by examiner

*Primary Examiner* — William J. Goodchild
(74) *Attorney, Agent, or Firm* — JCIPRNET

(57) ABSTRACT

The present disclosure discloses a dynamically traceable privacy-preserving distributed threshold signature system and method, which are applied to an environment composed of multiple signer modules, multiple aggregator modules, multiple notary modules, multiple tracer modules and a blockchain module; where the signer module signs data, encrypts a signature and uploads encrypted signature to the blockchain module; the aggregator module receives the encrypted signatures from the blockchain module and aggregates them into a synthetic signature, and at the same time sends a corresponding transaction to the blockchain module; the notary module locates the synthetic signature in the blockchain module and partially decrypts the synthetic signature into multiple synthetic signature fragments; the tracer module aggregates synthetic signature fragments and traces a set of signers; and the blockchain module consists of multiple nodes and is responsible for receiving transactions sent by each module.

2 Claims, 2 Drawing Sheets

DYNAMICALLY TRACEABLE PRIVACY-PRESERVING DISTRIBUTED THRESHOLD SIGNATURE SYSTEM AND METHOD

CROSS-REFERENCE TO RELATED APPLICATION

This application claims the priority benefit of China application serial no. 202310585847.X, filed on May 23, 2023. The entirety of the above-mentioned patent application is hereby incorporated by reference herein and made a part of this specification.

TECHNICAL FIELD

The present disclosure is a dynamically traceable privacy-protecting distributed threshold signature method and system, which belongs to the technical fields of privacy protection, threshold signature and blockchain.

BACKGROUND

Threshold signature allows a message to be signed when no less than t parties in a team of n parties participate in a signing process. A threshold signature is a key tool for many practical applications. Among them, there are two types of threshold signatures that are more eye-catching: an accountable threshold signature and a privacy threshold signature. The accountable threshold signature can reveal identities of all t signers who jointly generated the signature. Privacy threshold signature does not reveal a value of t or the identities of the t signers. In addition to being unforgeable, these two signatures provide traceability and privacy to a set of the signers, respectively.

However, previous threshold signature schemes require centralized servers to implement aggregation and traceability. If a single point of failure occurs, it may cause an entire system to collapse. At the same time, aggregators and tracers are not completely trustworthy, which may cause some privacy leak issues. Therefore, while ensuring traceability and privacy in the threshold signature scheme, it is also particularly important to implement a decentralized mechanism.

Generally speaking, in a traceability process of threshold signature, there is only one participant, the tracer, to realize the entire traceability process. However, the traceability process is a sensitive process and it should be notarized by a dynamic and relevant notarization group. However, previous threshold signature schemes do not use a notarization group to notarize the traceability process, which may result in a traceability result being unconvincing.

SUMMARY

In order to solve the above-mentioned deficiencies in the prior art, the present disclosure proposes a dynamically traceable privacy-preserving distributed threshold signature system and method. It is expected that during an aggregation or traceability process, it can resist the security threats of untrustworthy aggregators or tracers, and realize a dynamic notarization and traceability process, thereby protecting the unforgeability, traceability and privacy of the threshold signature.

In order to achieve the above-mentioned object, the present disclosure adopts the following technical solutions.

Characteristics of a dynamically traceable privacy-preserving distributed threshold signature system of the present disclosure include: n signer modules, $n_1$ aggregator modules, $n_3$ notary modules, $n_2$ tracer modules and a blockchain module;

any of the signer modules includes: a message signing unit, a signature encryption unit, and a transaction sending unit;

any of the aggregator modules includes: an encrypted signature receiving unit, a trusted execution environment unit, a blockchain signature unit, and a transaction sending unit;

any of the notary modules includes: a synthetic signature receiving unit, a token generation unit, a data partial decryption unit, and a transaction sending unit;

any of the tracer modules includes: a blockchain signature verification unit and a trusted execution environment unit;

the blockchain module includes: a transaction receiving unit and a consensus unit;

where the message signing unit of the i-th signer module signs a message m to obtain i-th signature data $\sigma_1$, and uses the signature encryption unit to encrypt the i-th signature data $\sigma_i$ to obtain an i-th encrypted signature $\sigma_i$; the transaction sending unit of the i-th signer module sends the i-th encrypted signature $\sigma_i$ to the transaction receiving unit of the blockchain module; where, $i \in [1,t]$, t is a threshold value for selecting a group of signers from n signers, $t \in [1,n]$;

the encrypted signature receiving unit of the j-th aggregator module obtains the i-th encrypted signature $\sigma_i$ from the blockchain module and forwards the i-th encrypted signature $\sigma_i$ to the trusted execution environment unit of the j-th aggregator module; the trusted execution environment unit decrypts the i-th encrypted signature $\sigma_i$ to obtain i-th decrypted signature data $\sigma_{ij}$, so as to obtain t pieces of decrypted signature data $\{\sigma_{ij}\}_{i=1}^{t}$; the trusted execution environment unit of the j-th aggregator module aggregates t pieces of decrypted signature data $\{\sigma_{ij}\}_{i=1}^{t}$ to obtain a j-th aggregate signature $\sigma_j^m$ of the message m;

the trusted execution environment unit of the j-th aggregator module selects t' notaries from $n_3$ notaries to form a notary set $N_j$, and encrypts the j-th aggregate signature $\sigma_j^m$ according to the notary set $N_j$ to obtain a j-th synthetic signature $\overline{\sigma_{N_j}}$; the blockchain signature unit of the j-th aggregator module signs the j-th synthetic signature $\overline{\sigma_{N_j}}$ to obtain a j-th blockchain signature $\eta_j$; the transaction sending unit of the j-th aggregator module sends the j-th blockchain signature $\eta_j$ to the transaction receiving unit of the blockchain module; where $j \in [1,n_1]$.

the token generation unit of the o-th notary module generates an o-th query token $td_o$ according to an identity attribute of the o-th notary module, and the transaction sending unit of the o-th notary module sends the o-th query token to the transaction receiving unit of the blockchain module;

the transaction receiving unit of the blockchain module receives the o-th query token and uses a smart contract to locate the synthetic signature $\overline{\sigma_{N_j}}$, and sends the synthetic signature $\overline{\sigma_{N_j}}$ to the synthetic signature receiving unit of the o-th notary module; where $o \in [1,t']$.

after receiving the synthetic signature $\overline{\sigma_{N_j}}$, the synthetic signature receiving unit of the o-th notary module forwards the synthetic signature $\overline{\sigma_{N_j}}$ to the data partial decryption unit of the o-th notary module; the data partial decryption unit partially decrypts the synthetic signature $\overline{\sigma}_{N_j}$ to obtain a decrypted fragment $\sigma_{oj}{}^m$ of the message m, and encrypts the decrypted fragment $\sigma_{oj}{}^m$ to obtain a synthetic signature fragment $\overline{uvk}_{oj}$; such that the transaction sending unit of the o-th notary module sends the synthetic signature fragment $\overline{uvk}_{oj}$ to the transaction receiving unit of the blockchain module;

the l-th tracer module obtains the j-th blockchain signature $n_j$ from the blockchain module, and uses the blockchain signature verification unit to verify the j-th blockchain signature $\eta_j$; after the verification is passed, obtains the synthetic signature fragment $\overline{uvk}_{oj}$ and the notary set N and forwards the synthetic signature fragment $\overline{uvk}_{oj}$ and the notary set to the $N_j$ trusted execution environment unit of the l-th tracer module; the trusted execution environment unit of the l-th tracer module decrypts the synthetic signature fragment $\overline{uvk}_{oj}$ to obtain a decrypted fragment $\sigma_{oj}{}^m$, so as to obtain t' decrypted fragments $\{\sigma_{oj}{}^m\}_{o=1}{}^{t'}$; the trusted execution environment unit of the l-th tracer module aggregates t' decryption fragments $\{\sigma_{oj}{}^m\}_{o=1}{}^{t'}$ into the synthetic signature $\overline{\sigma}_{N_j}$, so as to perform tracing according to the synthetic signature $\overline{\sigma}_{N_j}$ to obtain the i-th signer module participating in the signature.

Characteristics of a dynamically traceable privacy-preserving distributed threshold signature method of the present disclosure are that it is applied in an environment composed of n signers, $n_1$ aggregators, $n_3$ notaries, $n_2$ tracers and a blockchain, where the threshold signature method is executed as follows:

step 1: initialization:

step 1.1: setting a security parameter $1^\lambda$, where $\lambda$ is a length of the security parameter; defining a threshold value as t, and then using a key generation algorithm ATS.KeyGen($1^\lambda$,n,t) of an accountable threshold signature to generate a public key $p^k$ and a private key set $(sk_1, sk_2, \ldots, sk_i, \ldots, sk_t)$ of the accountable threshold signature, where $sk_i$ represents a private key of the i-th signer; $i \in [1,t]$;

selecting a random number $r_{pk}$ from a group $R_\lambda$ to generate a cryptographic commitment $com_{pk}$ of the public key $p_k$, where $R_\lambda$ is a real number group with a security parameter length of $\lambda$;

using a key generation algorithm SIG.KeyGen($1^\lambda$, j) of a blockchain signature to obtain a public key $pk_j^s$ and a private key $sk_j^s$ of the blockchain signature of the j-th aggregator, where j is an identity attribute of the aggregator, $j \in [1,n_1]$;

using an encryption algorithm PKE.KeyGen($1^\lambda$, j) to obtain a public key $pk_j^e$ and a private key $sk_j^e$ of a trusted execution environment of the j-th aggregator;

using an encryption algorithm PKE.KeyGen($1^\lambda$, l) to obtain a public key $pk_l^{enc}$ and a private key $sk_l^{enc}$ of a trusted execution environment of the l-th tracer, where l is an identity attribute of the aggregator, $l \in [1,n_2]$;

step 1.2: using an initialization algorithm DTPKE.Setup ($1^\lambda$) of a dynamic threshold public key encryption to obtain a master key mk, an encryption key ek, a decryption key dk, a verification key vk and a combined key ck;

using a user joining algorithm DTPKE.Join(mk,o) of the dynamic threshold public key encryption to obtain a user private key $usk_o$ of the o-th notary, a user public key $upk_o$ of the o-th notary and a user version number $uvk_o$ of the o-th notary, $o \in [1,t']$;

using a key generation algorithm KASE.KeyGen($\lambda$) of a key aggregation searchable encryption to obtain a public key mpk and a private key msk of the key aggregation searchable encryption;

using an extraction algorithm KASE.Extract(msk,G) of the key aggregation searchable encryption to obtain an aggregate key $k_a$;

step 1.3: combining pk $sk_j^e$, t, ek and $r_{pk}$ to obtain a j-th aggregate key $sk_j^c = (pk, sk_j^e, t, ek, r_{pk})$.

combining $sk_l^{enc}$, ck, and pk to obtain a l-th traceability key $sk_l^t = (sk_l^{enc}, ck, pk)$.

using a hash algorithm Hash(GID,time) to obtain an identifier gid of a signature group S, where GID is a group number of the signature group S, time is a signature time of the signature group S, GID$\in$G; the signature group S is composed of t signers;

step 1.4: combining $Com_{pk}$, ek, dk, vk, $\{pk_j^s\}_{j=1}{}^{n_t}$, $\{pk_j^e\}_{j=1}{}^{n_t}$, B, PK, H, mpk gid and $k_a$, to obtain a system public key $PK = (com_{pk}, ek, dk, vk, \{pk_j^s\}_{j=1}{}^{n_t}, \{pk_j^e\}_{j=1}{}^{n_t}, B, PK, H, mpk, gid, k_a)$, where gid represents an identifier set of the signature group S;

step 2: message signature:

step 2.1: according to the private key $Sk_i$, a message m and the signature group S, using, by the i-th signer, a signature algorithm ATS.Sign($sk_i$, m, S) of the accountable threshold signature to obtain signature data $\sigma_i$ of the message m;

obtaining, by the i-th signer, the encrypted signature $\sigma_i$ according to the public key $pk_j^e$ of the j-th trusted execution environment and a string $m\|\sigma_i\|N_j\|$gid to be encrypted, sending the encrypted signature $\sigma_i$ to the blockchain, where $\|$ represents a string connector, $N_j$ represents a set of notaries selected by the j-th aggregator, $i \in [1,t]$.

step 3: aggregating signatures:

step 3.1: obtaining, by any j-th aggregator, all encrypted signatures $\{\sigma_i\}_{i=1}{}^t$ of the signature group S from the blockchain, where $\sigma_i$ represents an encrypted signature of the i-th signer;

in the trusted execution environment, decrypting the encrypted signature $\{\sigma_i\}_{i=1}{}^t$ sequentially by using the private key $sk_j^e$ of the trusted execution environment, to obtain a signature set $\{\sigma_i\}_{i=1}{}^t$, the notary set N j and the identifier gid of the signature group S; where $\sigma_i$ represents a signature of the i-th signer;

according to the public key pk, the message m, the signature group S and the signature set $\{\sigma_i\}_{i=1}{}^t$, obtaining the j-th aggregate signature $\sigma_j{}^m$ of the message m by using an aggregation algorithm ATS.Combine(pk,m,S, $\{\sigma\}_{i=1}{}^t$) of the accountable threshold signature;

according to the j-th aggregate signature $\sigma_j{}^m$, the notary set $N_j$ and the encryption N key ek, obtaining the synthetic signature $\overline{\sigma}_{N_j}$ by using the encryption algorithm DTPKE.Enc(ek,$N_j$,$\sigma_j{}^m$) of a dynamic threshold public key encryption;

according to the public key mpk, the identifier gid of the signature group S and the notary set $N_j$, obtaining an encrypted cipher text pair $(c_1{}^{gid}, c_2{}^{gid})$ and an encrypted index set $\{ind_o\}_{o=1}{}^{t'}$ by using an encryption algorithm KASE.Enc(mpk,gid,$N_j$) of the key aggregation searchable encryption, where indo represents an o-th security index, $o \in [1,t']$;

processing required proof data t', $com_{pk}$, ek, mpk, gid, m, $(c_1{}^{gid}, c_2{}^{gid})$, $\{ind_o\}_{o=1}{}^{n_3}$, $N_j$, $\sigma_j{}^m$, $r_{pk}$, pk by using a zero-knowledge proof generation algorithm to obtain a zero-knowledge proof $\pi$;

step 3.2: signing, by the j-th aggregator, the message m, the synthetic signature $\overline{\sigma}_{N_j}$, the encrypted cipher text pair $(c_1^{gid}, c_2^{gid})$, an encrypted index set $\{ind_o\}_{o=1}^{|N_j|}$ and the zero-knowledge proof $\pi$ by using the private key $sk_j^s$, to obtain the j-th blockchain signature $n_j$;

combining, by the j-th aggregator m, $\overline{\sigma_{N_j}}$, $(c_1^{gid}, c_2^{gid})$ $\{ind_o\}_{o=1}^{|N_j|}$, $\pi$ and $\eta_j$, to obtain a dynamically traceable privacy-preserving distributed threshold signature $\sigma$, and sending m and $\sigma$ to the blockchain;

step 4: tracing a set of signers:

step 4.1: according to an aggregation key $k_a$ in the system public key PK and an identity attribute o of the system public key PK, obtaining, by the o-th notary, a query token $td_o$ by using a token generation algorithm KASE.Trapdoor($k_a$,o) of the key aggregation searchable encryption, and sending the query token $td_o$ to the blockchain;

after receiving the query token $td_o$, obtaining, by a smart contract in the blockchain, an adjusted query token $td_o^{sid}$ by using an adjustment algorithm of the key aggregation searchable encryption;

according to the adjusted query token $td_o^{sid}$, obtaining, by the smart contract, the synthetic signature $\overline{\sigma_{N_j}}$ corresponding to the o-th notary by using a test algorithm of the key aggregation searchable encryption;

obtaining, by the o-th notary, the synthetic signature $\overline{\sigma_{N_j}}$ from the blockchain, and according to the identity attribute o, the decryption key dk and the user private key $usk_o$, obtaining a decrypted fragment $\sigma_{oj}^m$ of the message m by using a data partial decryption algorithm DTPKE.ShareDecrypt(dk,o,$usk_o$,$\overline{\sigma_{N_j}}$) of the dynamic threshold public key encryption;

encrypting, by the o-th notary, the decrypted fragment $\sigma_{oj}^m$ by using the public key $pk_l^{enc}$ of a trusted execution environment of the l-th tracer to obtain a synthetic signature fragment $\overline{uvk_{oj}}$, and sending the synthetic signature fragment $\overline{uvk_{oj}}$ to the blockchain;

step 4.2: receiving, by the l-th tracer, the synthetic signature fragment $\overline{uvk_{oj}}$ and the synthetic signature $\overline{\sigma_{N_j}}$ from the blockchain, decrypting the encrypted synthetic signature fragment $\overline{uvk_o}$ according to the private key $sk_l^{enc}$ of the trusted execution environment, to obtain the decrypted fragment $\sigma_{oj}^m$;

according to the encryption key ek, the notary set $N_j$ and the synthetic signature $\overline{\sigma_{N_j}}$, using, by the l-th tracer, a cipher text verification algorithm DTPKE.ValidateCT (ek,$N_j$,$\overline{\sigma_{N_j}}$) of the dynamic threshold public key encryption in the trusted execution environment to verify whether the synthetic signature $\overline{\sigma_{N_j}}$ is a valid encrypted cipher text of the notary set $N_j$ if so, outputting 1, otherwise, outputting 0;

according to the verification key vk, the identity attribute o of the o-th notary, the user version number $uvk_o$, the synthetic signature $\overline{\sigma_{N_j}}$ and a decryption fragment $\sigma_{oj}^m$, using, by the l-th tracer, a fragment verification algorithm of the dynamic threshold public key encryption in the trusted execution environment to verify whether the decrypted fragment $\sigma_{oj}^m$ is generated by the o-th notary, if so, outputting 1, otherwise, outputting 0;

according to the combined key ck, the notary set $N_j$, the synthetic signature $\overline{\sigma_{N_j}}$ and a decrypted fragment set $\{\sigma_{oj}^m\}_{o=1}^{t'}$, using, by the l-th tracer, a fragment combination algorithm DTPKE.Combine(ck, $N_j$,$o_{N_j}$, $\{\sigma_{oj}^m\}_{o=1}^{t'}$) of the dynamic threshold public key encryption in the trusted execution environment to obtain the j-th aggregate signature $\sigma_j^m$ corresponding to the notary set $N_j$:

according to the public key pk, the message m and the j-th aggregate signature $\sigma_j^m$, using, by the l-th tracer, a traceability algorithm ATS.Trace(pk,m,$o_j^m$) of the accountable threshold signature in the trusted execution environment to obtain the signature group S participating in signing the j-th aggregate signature $\sigma_j^m$.

Compared with the prior art, beneficial effects of the present disclosure are as follows.

1. A blockchain framework is used in the present disclosure. By distributing an aggregation (traceability) function in threshold signatures to multiple aggregators (tracers), attacks by untrusted aggregators (tracers) are prevented, decentralized aggregation and traceability are achieved and the occurrence of single point of failure in centralized server is effectively prevented.

2. The present disclosure uses trusted hardware as an execution environment for a partial aggregation (traceability) process, which ensures that the aggregation (traceability) process is not affected by untrusted aggregators (tracers).

3. The present disclosure uses dynamic threshold public key encryption to dynamically notarize the traceability process, and wakes up the notary through key aggregation searchable encryption, which effectively guarantees the dynamic traceability of the threshold signature.

4. The present disclosure uses a non-interactive zero-knowledge proof method to achieve public verification of a notary's identity, which ensures the correctness of the traceability result.

DESCRIPTION OF THE EMBODIMENTS

Figure 1:
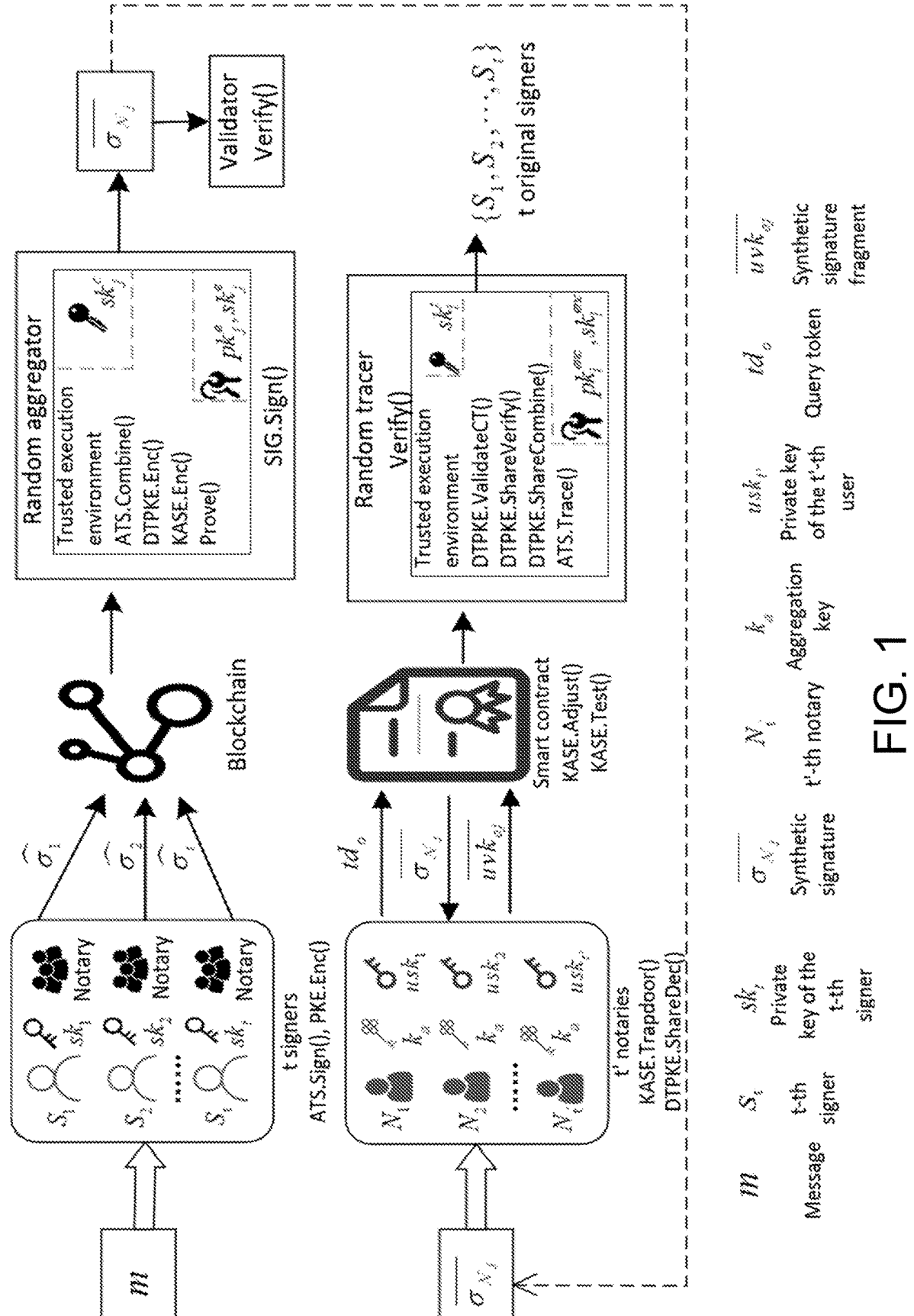
FIG. 1 is a flowchart of the present disclosure.

In this embodiment, a dynamically traceable privacy-preserving distributed threshold signature system, as shown in FIG. 1, includes multiple signer modules, multiple aggregator modules, multiple notary modules, multiple tracer modules, and a blockchain module.

Figure 2:
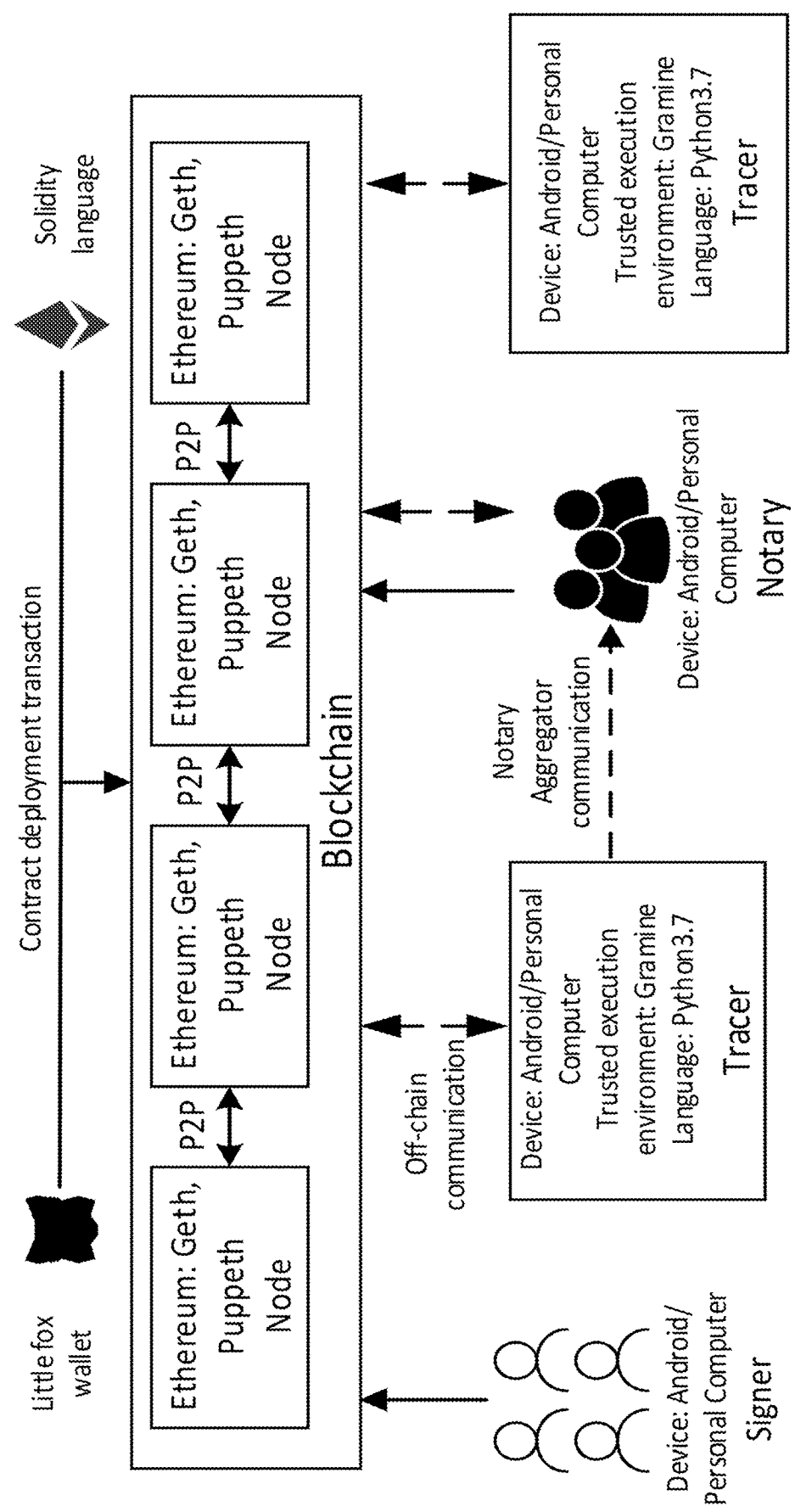
FIG. 2 is a detailed diagram of an implementation of the present disclosure.

As shown in FIG. 2, the signer module is implemented in the Android platform or a personal computer, while the aggregator module and the tracer module are implemented in a hardware platform of the Windows system. Where the processor needs to support the IntelSGX technology to run relevant protocols in a trusted memory area, the blockchain module uses a running Geth Ethereum client to build a blockchain, and a trusted third-party notary module is implemented in the Android platform or the personal computer.

Taking a once traceability threshold signature as an example, the signer module is a member of a signature group that wants to sign a message, the aggregator module and the tracer module are winning nodes that have dug the mine in the blockchain, a notary is a person from a third-party notary institution; and the blockchain module is a public blockchain composed of multiple full nodes.

Any of the signer modules includes: a message signing unit, a signature encryption unit, and a transaction sending unit.

Any of the aggregator modules includes: an encrypted signature receiving unit, a trusted execution environment unit, a blockchain signature unit, and a transaction sending unit.

Any of the notary modules includes: a synthetic signature receiving unit, a token generation unit, a data partial decryption unit, and a transaction sending unit.

Any of the tracer modules includes: a blockchain signature verification unit and a trusted execution environment unit.

The blockchain module includes: a transaction receiving unit and a consensus unit.

The message signing unit of the i-th signer module signs a message m to obtain i-th signature data $\sigma_i$, and uses the signature encryption unit to encrypt the i-th signature data $\sigma_i$ to obtain an i-th encrypted signature $\sigma_i$; the transaction sending unit of the i-th signer module sends the i-th encrypted signature $\sigma_i$ to the transaction receiving unit of the blockchain module; where, $i \in [1,t]$, t is a threshold value for selecting a group of signers from n signers, $t \in [1,n]$.

The encrypted signature receiving unit of the j-th aggregator module obtains the i-th encrypted signature $\sigma_i$ from the blockchain module and forwards the i-th encrypted signature $\sigma_i$ to the trusted execution environment unit of the j-th aggregator module; the trusted execution environment unit decrypts the i-th encrypted signature $\sigma_i$ to obtain i-th decrypted signature data $\sigma_{ij}$, so as to obtain t pieces of decrypted signature data $\{\sigma_{ij}\}_{i=1}^{t}$; the trusted execution environment unit of the j-th aggregator module aggregates t pieces of decrypted signature data $\{\sigma_{ij}\}_{i=1}^{t}$ to obtain a j-th aggregate signature $\sigma_j^m$ of the message m.

The trusted execution environment unit of the j-th aggregator module selects t' notaries from $n_3$ notaries to form a notary set $N_j$, and encrypts the j-th aggregate signature $\sigma_j^m$ according to the notary set $N_j$ to obtain a j-th synthetic signature $\overline{\sigma_{N_j}}$; the blockchain signature unit of the j-th aggregator module signs the j-th synthetic signature $\overline{\sigma_{N_j}}$ to obtain a j-th blockchain signature $\eta_j$; the transaction sending unit of the j-th aggregator module sends the j-th blockchain signature $\eta_j$ to the transaction receiving unit of the blockchain module; where $j \in [1,n_1]$.

The token generation unit of the o-th notary module generates an o-th query token $td_o$ according to an identity attribute of the o-th notary module, and the transaction sending unit of the o-th notary module sends the o-th query token to the transaction receiving unit of the blockchain module.

The transaction receiving unit of the blockchain module receives the o-th query token and uses the smart contract to locate the synthetic signature $\overline{\sigma_{N_j}}$, and sends the synthetic signature $\overline{\sigma_{N_j}}$ to the synthetic signature receiving unit of the o-th notary module; where $o \in [1,t']$.

After receiving the synthetic signature $\overline{\sigma_{N_j}}$, the synthetic signature receiving unit of the o-th notary module forwards the synthetic signature $\overline{\sigma_{N_j}}$ to the data partial decryption unit of the o-th notary module; the data partial decryption unit partially decrypts the synthetic signature $\overline{\sigma_{N_j}}$ to obtain a decrypted fragment $\sigma_{oj}^m$ of the message m, and encrypts the decrypted fragment $\sigma_{oj}^m$ to obtain a synthetic signature fragment $\overline{uvk_{oj}}$; such that the transaction sending unit of the o-th notary module sends the synthetic signature fragment $\overline{uvk_{oj}}$ to the transaction receiving unit of the blockchain module.

The l-th tracer module obtains the j-th blockchain signature $\eta_j$ from the blockchain module, and uses the blockchain signature verification unit to verify the j-th blockchain signature $\eta_j$; after the verification is passed, obtains the synthetic signature fragment $\overline{uvk_{oj}}$ and the notary set $N_j$ and forwards the synthetic signature fragment $\overline{uvk_{oj}}$ and the notary set $N_j$ to the trusted execution environment unit of the l-th tracer module; the trusted execution environment unit of the l-th tracer module decrypts the synthetic signature fragment $\overline{uvk_{oj}}$ to obtain a decrypted fragment $\sigma_{oj}^m$, so as to obtain t' decrypted fragments $\{\sigma_{oj}^m\}_{o=1}^{t'}$; the trusted execution environment unit of the l-th tracer module aggregates t' decryption fragments $\{\sigma_{oj}^m\}_{o=1}^{t'}$ into the synthetic signature $\overline{\sigma_{N_j}}$, so as to perform tracing according to the synthetic signature $\overline{\sigma_{N_j}}$ to obtain the i-th signer module participating in the signature.

In this embodiment, a dynamically traceable privacy-preserving distributed threshold signature method is applied in an environment composed of n signers, $n_1$ aggregators, $n_3$ notaries, $n_2$ tracers and a blockchain. The threshold signature method is executed as follows.

step 1: initialization.

Step 1.1: setting a security parameter $1^\lambda$, where $\lambda$ is a length of the security parameter; defining a threshold value as, and then using a key generation algorithm ATS.KeyGen $(1^\lambda, n, t)$ of an accountable threshold signature to generate a public key pk and a private key set $(sk_1, sk_2, \ldots, sk_i, \ldots, sk_t)$ of the accountable threshold signature, where $sk_i$ represents a private key of the i-th signer; $i \in [1,t]$.

A random number $r_{pk}$ is selected from a group $R_\lambda$ to generate a cryptographic commitment $com_{pk}$ of the public key pk, where $R_\lambda$ is a real number group with a security parameter length of 2.

A key generation algorithm SIG.KeyGen$(1^\lambda, l)$ of a blockchain signature is used to obtain a public key $pk_j^s$ and a private key $sk_j^s$ of the blockchain signature of the j-th aggregator, where j is an identity attribute of the aggregator, $j \in [1,n_1]$.

An encryption algorithm PKE.KeyGen$(1^\lambda, j)$ is used to obtain a public key $pk_j^e$ and a private key $sk_j^e$ of a trusted execution environment of the j-th aggregator.

An encryption algorithm PKE.KeyGen$(1^\lambda, l)$ is used to obtain a public key $pk_l^{enc}$ and a private key $sk_l^{enc}$ of a trusted execution environment of the l-th tracer, where l is an identity attribute of the aggregator, $l \in [1,n_2]$ and each aggregator and tracer has a trusted execution environment.

Step 1.2: using an initialization algorithm DTPKE.Setup $(1^\lambda)$ of a dynamic threshold public key encryption to obtain a master key mk, an encryption key ek, a decryption key dk, a verification key vk and a combined key ck.

A user joining algorithm DTPKE.Join(mk,o) of the dynamic threshold public key encryption is used to obtain a user private key $usk_o$ of the o-th notary, a user public key $upk_o$ of the o-th notary and a user version number $uvk_o$ of the o-th notary, $o \in [1,t']$.

An initialization algorithm KASE.Setup$(\lambda, |G|)$ of key aggregation searchable encryption is used to obtain a bilinear mapping system B, a key aggregation searchable encryption public key PK, and a one-way hash function H. Where B consists of three p-order cyclic groups G1, G2, GT, and a bilinear mapping relationship e: $G_1 \times G_2 \rightarrow GT$, where × represents pairing, → represents mapping, e is a bilinear mapping calculation function, G is a cyclic group, and |G| represents an order of the group G.

A key generation algorithm KASE.KeyGen$(\lambda)$ of a key aggregation searchable encryption is used to obtain a public key mpk and a private key msk of the key aggregation searchable encryption.

An extraction algorithm KASE.Extract(msk,G) of the key aggregation searchable encryption is used to obtain an aggregate key $k_a$.

Step 1.3: combining pk, $sk_j^e$, t, ek and $r_{pk}$ to obtain a j-th aggregate key $sk_j^c = (pk, sk_j^e, t, ek, r_{pk})$; and combining $sk_l^{enc}$, ck, and pk to obtain a l-th traceability key $sk_l^t = (sk_l^{enc}, ck, pk)$.

A hash algorithm Hash(GID,time) is used to obtain an identifier gid of a signature group S, where the hash algorithm uses a 256 bit secure hash algorithm, GID is a group number of the signature group S, time is a signature time of the signature group S, GID∈G; and the signature group S is composed of t signers.

Step 1.4: combining $com_{pk}$, ek, dk, vk, $\{pk_j^s\}_{j=1}^{n_t}$, $\{pk_j^e\}_{j=1}^{n_t}$, B, PK, H, mpk gid and $k_a$), to obtain a system public key $$PK=(com_{pk},ek,dk,vk,\{pk_j^s\}_{j=1}^{n_t},\{pk_j^e\}_{j=1}^{n_t},B,PK,H,$$
$$mpk,gid,k_a),$$

where gid represents an identifier set of the signature group S.

step 2: message signature.

Step 2.1: according to the private key $sk_i$, a message m and the signature group S, using, by the i-th signer, a signature algorithm ATS.Sign($sk_i$,m,S) of the accountable threshold signature to obtain signature data $\sigma_i$ of the message m.

The i-th signer obtains the encrypted signature $\sigma_i$ according to the public key $pk_j^e$ oj the j-th trusted execution environment and a string $m\|\sigma_i\|N_j\|$gid to be encrypted, and sends the encrypted signature $\sigma_i$ to the blockchain, where $\|$ represents a string connector, $N_j$ represents a set of notaries selected by the j-th aggregator, i∈[1,t].

step 3: aggregating signatures.

Step 3.1: obtaining, by any j-th aggregator, all encrypted signatures $\{\sigma_i\}_{i=1}^t$ of the signature group S from the blockchain, where $\sigma_i$ represents an encrypted signature of the i-th signer.

In the trusted execution environment, the encrypted signature $\{\sigma_i\}_{i=1}^t$ is sequentially decrypted by using the private key $sk_j^e$ of the trusted execution environment, to obtain a signature set $\{\sigma_i\}_{i=1}^t$, the notary set $N_j$ and the identifier gid of the signature group S; where $\sigma_i$ represents a signature of the i-th signer.

According to the public key pk, the message m, the signature group S and the signature set $\{\sigma_i\}_{i=1}^t$, the j-th aggregate signature $\sigma_j^m$ of the message m is obtained by using an aggregation algorithm ATS.Combine(pk,m,S, $\{\sigma\}_{i=1}^t$) of the accountable threshold signature.

According to the j-th aggregate signature $\sigma_j^m$, the notary set $N_j$ and the encryption key ek, the synthetic signature $\overline{\sigma_{N_j}}$ is obtained by using the encryption algorithm DTPKE.Enc (ek,$N_j$,$\sigma_j^m$) of a dynamic threshold public key encryption.

According to the public key mpk, the identifier gid of the signature group S and the notary set $N_j$, an encrypted cipher text pair $(c_1^{gid},c_2^{gid})$ and an encrypted index set $\{ind_o\}_{o=1}^{t'}$ are obtained by using an encryption algorithm KASE.Enc (mpk,gid,$N_j$) of the key aggregation searchable encryption, where $ind_o$ represents an o-th security index, o∈[1,t'].

Required proof data t', $com_{pk}$, ek, mpk, gid, m, $(c_1^{gid}, c_2^{gid})$, $\{ind_o\}_{o=1}^{n_3}$,$N_j$, $\sigma_j^m$, $r_{pk}$, pk is performed by using a zero-knowledge proof generation algorithm, to obtain a zero-knowledge proof π.

Step 3.2: signing, by the j-th aggregator, the message m, the synthetic signature $\overline{\sigma_{N_j}}$, the encrypted cipher text pair $(c_1^{gid}, c_2^{gid})$, an encrypted index set $\{ind_o\}_{o=1}^{|N_j|}$ and the zero-knowledge proof π by using the private key $sk_j^s$, to obtain the j-th blockchain signature $\eta_j$.

The j-th aggregator combines m, $\overline{\sigma_{N_j}}$, $(c_1^{gid}, c_2^{gid})$, $\{ind_o\}_{o=1}^{|N_j|}$, π and $\eta_j$, to obtain a dynamically traceable privacy-preserving distributed threshold signature σ, and sends m and σ to the blockchain.

step 4: tracing a set of signers.

Step 4.1: according to an aggregation key $k_a$ in the system public key PK and an identity attribute o of the system public key PK, obtaining, by the o-th notary, a query token $td_o$ by using a token generation algorithm KASETrapdoor $(k_a,o)$ of the key aggregation searchable encryption, and sending the query token $td_o$ to the blockchain.

After receiving the query token $td_o$, a smart contract in the blockchain obtains an adjusted query token td sid by using an adjustment algorithm of the key aggregation searchable encryption.

According to the adjusted query token $td_o^{gid}$, the smart contract obtains the synthetic signature $\overline{\sigma_{N_j}}$ corresponding to the o-th notary by using a test algorithm of the key aggregation searchable encryption.

The o-th notary obtains the synthetic signature $\overline{\sigma_{N_j}}$ from the blockchain, and according to the identity attribute o, the decryption key dk and the user private key $usk_o$, obtains a decrypted fragment $\sigma_{oj}^m$ of the message m by using a data partial decryption algorithm DTPKE.ShareDecrypt(dk,o, $usk_o,\overline{\sigma_{N_j}}$) of the dynamic threshold public key encryption.

The o-th notary encrypts the decrypted fragment $\sigma_{oj}^m$ by using the public key $pk_l^{enc}$ of a trusted execution environment of the l-th tracer to obtain a synthetic signature fragment $\overline{uvk_{oj}}$, and sends the synthetic signature fragment $\overline{uvk_{oj}}$ to the blockchain.

Step 4.2: receiving, by the l-th tracer, the synthetic signature fragment $\overline{uvk_{oj}}$ and the synthetic signature $\overline{\sigma_{N_j}}$ from the blockchain, decrypting the encrypted synthetic signature fragment $\overline{uvk_o}$ according to the private key $sk_l^{enc}$ of the trusted execution environment, to obtain the decrypted fragment $\sigma_{oj}^m$.

According to the encryption key ek, the notary set $N_j$ and the synthetic signature $\overline{\sigma_{N_j}}$, the l-th tracer uses a cipher text verification algorithm DTPKE.ValidateCT(ek,$N_j,\overline{\sigma_{N_j}}$) of the dynamic threshold public key encryption in the trusted execution environment to verify whether the synthetic signature $\overline{\sigma_{N_j}}$ is a valid encrypted cipher text of the notary set $N_j$, if so, outputs 1, otherwise, outputs 0.

According to the verification key vk, the identity attribute o of the o-th notary, the user version number $uvk_o$, the synthetic signature $\sigma_{N_j}$ and a decryption fragment $\sigma_{oj}^m$, the l-th tracer uses a fragment verification algorithm of the dynamic threshold public key encryption in the trusted execution environment to verify whether the decrypted fragment $\sigma_{oj}^m$ is generated by the o-th notary, if so, outputs 1, otherwise, outputs 0.

According to the combined key ck, the notary set $N_j$, the synthetic signature $\overline{\sigma_{N_j}}$ and a decrypted fragment set $\{\sigma_{oj}^m\}_{o=1}^{t'}$, the l-th tracer uses a fragment combination algorithm DTPKE.Combine(ck, $N_j,\sigma_{N_j},\{\sigma_{oj}^m\}_{o=1}^{t'}$) of the dynamic threshold public key encryption in the trusted execution environment to obtain the j-th aggregate signature $\sigma_j^m$ corresponding to m the notary set $N_j$.

According to the public key pk, the message m and the j-th aggregate signature $\sigma_j^m$, the l-th tracer uses a traceability algorithm ATS.Trace(pk,m,$\sigma_j^m$) of the accountable threshold signature in the trusted execution environment to obtain the signature group S participating in signing the j-th aggregate signature $\sigma_j^m$.

In summary, the present disclosure has made improvements on the basis of previous threshold signatures, which implements a dynamically traceable privacy-preserving distributed threshold signature method and system. The present disclosure can effectively resist attacks by untrustworthy tracers and aggregators, and protect the unforgeability, traceability and privacy of the threshold signatures.

What is claimed is:

1. A dynamically traceable privacy-preserving distributed threshold signature system, comprising: n signer modules, $n_1$ aggregator modules, $n_3$ notary modules, $n_2$ tracer modules and a blockchain module;

any of the signer modules comprises: a message signing unit, a signature encryption unit, and a transaction sending unit;

any of the aggregator modules comprises: an encrypted signature receiving unit, a trusted execution environment unit, a blockchain signature unit, and a transaction sending unit;

any of the notary modules comprises: a synthetic signature receiving unit, a token generation unit, a data partial decryption unit, and a transaction sending unit;

any of the tracer modules comprises: a blockchain signature verification unit and a trusted execution environment unit;

the blockchain module comprises: a transaction receiving unit and a consensus unit;

wherein the message signing unit of the i-th signer module signs a message m to obtain i-th signature data $\sigma_i$, and uses the signature encryption unit to encrypt the i-th signature data $\sigma_i$ to obtain an i-th encrypted signature $\sigma_i$; the transaction sending unit of the i-th signer module sends the i-th encrypted signature $\sigma_i$ to the transaction receiving unit of the blockchain module; wherein, $i \in [1,t]$, t is a threshold value for selecting a group of signers from n signers, $t \in [1,n]$;

the encrypted signature receiving unit of the j-th aggregator module obtains the i-th encrypted signature $\sigma_i$ from the blockchain module and forwards the i-th encrypted signature $\sigma_i$ to the trusted execution environment unit of the j-th aggregator module; the trusted execution environment unit decrypts the i-th encrypted signature $\sigma_i$ to obtain i-th decrypted signature data $\sigma_{ij}$, so as to obtain t pieces of decrypted signature data $\{\sigma_{ij}\}_{i=1}^t$; the trusted execution environment unit of the j-th aggregator module aggregates t pieces of decrypted signature data $\{\sigma_{ij}\}_{i=1}^t$ to obtain a j-th aggregate signature $\sigma_j^m$ of the message m;

the trusted execution environment unit of the j-th aggregator module selects t' notaries from $n_3$ notaries to form a notary set $N_j$, and encrypts the j-th aggregate signature $\sigma_j^m$ according to the notary set $N_j$ to obtain a j-th synthetic signature $\overline{\sigma_{N_j}}$; the blockchain signature unit of the j-th aggregator module signs the j-th synthetic signature $\overline{\sigma_{N_j}}$ to obtain a j-th blockchain signature $\eta_j$; the transaction sending unit of the j-th aggregator module sends the j-th blockchain signature $\eta_j$ to the transaction receiving unit of the blockchain module; wherein $j \in [1,n_1]$;

the token generation unit of the o-th notary module generates an o-th query token $td_o$ according to an identity attribute of the o-th notary module, and the transaction sending unit of the o-th notary module sends the o-th query token to the transaction receiving unit of the blockchain module;

the transaction receiving unit of the blockchain module receives the o-th query token and uses a smart contract to locate the synthetic signature, and sends the synthetic signature $\overline{\sigma_{N_j}}$ to the synthetic signature receiving unit of the o-th notary module; wherein $o \in [1,t']$;

after receiving the synthetic signature $\overline{\sigma_{N_j}}$, the synthetic signature receiving unit of the o-th notary module forwards the synthetic signature $\overline{\sigma_{N_j}}$ to the data partial decryption unit of the o-th notary module; the data partial decryption unit partially decrypts the synthetic signature $\overline{\sigma_{N_j}}$ to obtain a decrypted fragment $\sigma_{oj}^m$ of the message m, and encrypts the decrypted fragment $\sigma_{oj}^m$ to obtain a synthetic signature fragment $\overline{uvk_{oj}}$; such that the transaction sending unit of the o-th notary module sends the synthetic signature fragment $\overline{uvk_{oj}}$ to the transaction receiving unit of the blockchain module;

the l-th tracer module obtains the j-th blockchain signature $\eta_j$ from the blockchain module, and uses the blockchain signature verification unit to verify the j-th blockchain signature $\eta_j$; after the verification is passed, obtains the synthetic signature fragment $\overline{uvk_{oj}}$ and the notary set $N_j$ and forwards the synthetic signature fragment $\overline{uvk_{oj}}$ and the notary set $N_j$ to the trusted execution environment unit of the l-th tracer module; the trusted execution environment a unit of the l-th tracer module decrypts the synthetic signature fragment $uvk_{oj}$ to obtain a decrypted fragments $\sigma_{oj}^m$, so as to obtain t' decrypted fragments $\{\sigma_{oj}^m\}_{o=1}^{t'}$, the trusted execution environment unit of the l-th tracer module aggregates t' decryption fragments $\{\sigma_{oj}^m\}_{o=1}^{t'}$ into the synthetic signature $\overline{\sigma_{N_j}}$, so as to perform tracing according to the synthetic signature $\overline{\sigma_{N_j}}$ to obtain the i-th signer module participating in the signature.

2. A dynamically traceable privacy-preserving distributed threshold signature method, applied in an environment composed of n signers, $n_1$ aggregators, $n_3$ notaries, $n_2$ tracers and a blockchain, wherein the threshold signature method is executed as follows:

step 1: initialization:

step 1.1: setting a security parameter $1^\lambda$, wherein $\lambda$ is a length of the security parameter; defining a threshold value as t, and then using a key generation algorithm ATS.KeyGen($1^\lambda$,n,t) of an accountable threshold signature to generate a public key pk and a private key set $(sk_1, sk_2, \ldots, sk_i, \ldots, sk_t)$ of the accountable threshold signature, wherein $sk_i$ represents a private key of the i-th signer; $i \in [1,t]$;

selecting a random number $r_{pk}$ from a group $R_\lambda$ to generate a cryptographic commitment $com_{pk}$ of the public key pk, wherein $R_\lambda$ is a real number group with a security parameter length of $\lambda$;

using a key generation algorithm SIG.KeyGen($1^\lambda$,j) of a blockchain signature to obtain a public key $pk_j^s$ and a private key $sk_j^s$ of the blockchain signature of the j-th aggregator, wherein j is an identity attribute of the aggregator, $j \in [1,n_1]$;

using an encryption algorithm PKE.KeyGen($1^\lambda$,j) to obtain a public key $pk_j^e$ and a private key $sk_j^e$ of a trusted execution environment of the j-th aggregator;

using an encryption algorithm PKE.KeyGen($1\lambda$,l) to obtain a public key $pk_l^{enc}$ and a private key $sk_l^{enc}$ of a trusted execution environment of the l-th tracer, wherein l is an identity attribute of the aggregator, $l \in [1,n_2]$;

step 1.2: using an initialization algorithm DTPKE.Setup $(1^\lambda)$ of a dynamic threshold public key encryption to obtain a master key mk, an encryption key ek, a decryption key dk, a verification key vk and a combined key Ck;

using a user joining algorithm DTPKE.Join(mk,o) of the dynamic threshold public key encryption to obtain a user private key $usk_o$ of the o-th notary, a user public key $upk_o$ of the o-th notary and a user version number $uvk_o$ of the o-th notary, $o \in [1,t']$;

using a key generation algorithm KASE.KeyGen($\lambda$) of a key aggregation searchable encryption to obtain a public key mpk and a private key msk of the key aggregation searchable encryption;

using an extraction algorithm KASE.Extract(msk,G) of the key aggregation searchable encryption to obtain an aggregate key $k_a$;

step 1.3: combining pk, $sk_j^e$, t, ek and $r_{pk}$ to obtain a j-th aggregate key $sk_j^c=(pk,sk_j^e,t,ek,r_{pk})$; combining $sk_l^{enc}$, ck, and pk to obtain a l-th traceability key $sk_l^t=(sk_l^{enc}, ck,pk)$;

using a hash algorithm Hash(GID,time) to obtain an identifier gid of a signature group S wherein GID is a group number of the signature group S, time is a signature time of the signature group S, GID∈G; the signature group S is composed of t signers;

step 1.4: combining $com_{pk}$, ek, dk, vk, $\{pk_j^s\}_{j=1}^{n1}$, $\{pk_j^e\}_{j=1}^{n1}$, B, PK, H, mpk, gid and $k_a$, to obtain a system public key $PK=(com_{pk},ek,dk,vk,\{pk_j^s\}_{j=1}^{n1}, \{pk_j^e\}_{j=1}^{n1},B,PK,H,mpk,gid,k_a)$, wherein gid represents an identifier set of the signature group S;

step 2: message signature:

step 2.1: according to the private key $sk_i$, a message m and the signature group S using, by the i-th signer, a signature algorithm ATS.Sign($sk_i$,m,S) of the accountable threshold signature to obtain signature data $\sigma_i$ of the message m;

obtaining, by the i-th signer, the encrypted signature $\sigma_i$ according to the public key $pk_j^e$ of the j-th trusted execution environment and a string $m\|\sigma_i\|N_j\|$gid to be encrypted, sending the encrypted signature $\sigma_i$ to the blockchain, wherein $\|$ represents a string connector, $N_j$ represents a set of notaries selected by the j-th aggregator, i∈[1,t];

step 3: aggregating signatures:

step 3.1: obtaining, by any j-th aggregator, all encrypted signatures $\{\sigma_i\}_{i=1}^t$ of the signature group S from the blockchain, wherein $\sigma_i$ represents an encrypted signature of the i-th signer;

in the trusted execution environment, decrypting the encrypted signature $\{\sigma_i\}_{i=1}^t$ sequentially by using the private key $sk_j^e$ of the trusted execution environment, to obtain a signature set $\{\sigma_i\}_{i=1}^t$, a notary set $N_j$ and the identifier gid of the signature group S; wherein $\sigma_i$ represents a signature of the i-th signer;

according to the public key pk, the message m, the signature group S and the signature set $\{\sigma_i\}_{i=1}^t$, obtaining a j-th aggregate signature $\sigma_j^m$ of the message m by using an aggregation algorithm ATS.Combine(pk, m, S, $\{\sigma\}_{i=1}^t$) of the accountable threshold signature;

according to the j-th aggregate signature $\sigma_j^m$, the notary set $N_j$ and the encryption key ek, obtaining a synthetic signature $\overline{\sigma_{N_j}}$ by using the encryption algorithm DTPKE.Enc(ek, $N_j$, $\sigma_j^m$) of a dynamic threshold public key encryption;

according to the public key mpk, the identifier gid of the signature group S and the notary set t $N_j$, obtaining an encrypted cipher text pair $(c_1^{gid}, c_2^{gid})$ and an encrypted index set $\{ind_o\}_{o=1}^{t'}$ by using an encryption algorithm KASE.Enc(mpk, gid, $N_j$) of the key aggregation searchable encryption, wherein $ind_o$ represents an o-th security index, o∈[1,t'];

processing required proof data t', $com_{pk}$, ek, mpk, gid, m, $(c_1^{gid}, c_2^{gid})$ $\{ind_o\}_{o=1}^{t'}$, $N_j$, $\sigma_j^m$, $r_{pk}$, pk by using a zero-knowledge proof generation algorithm to obtain a zero-knowledge proof π;

step 3.2: signing, by the j-th aggregator, the message m, the synthetic signature $\overline{\sigma_{N_j}}$, the encrypted cipher text pair $(c_1^{gid}, c_2^{gid})$,an encrypted index set $\{ind_o\}_{o=1}^{|N_j|}$ and the zero-knowledge proof π by using the private key $sk_j^s$, to obtain a j-th blockchain signature $\eta_j$;

combining, by the j-th aggregator m, $\sigma_{N_j}$, $(c_1^{gid}, c_2^{gid})$, $\{ind_o\}_{o=1}^{|N_j|}$, π and $\eta_j$, to obtain a dynamically traceable privacy-preserving distributed threshold signature σ, and sending m and σ to the blockchain;

step 4: tracing a set of signers:

step 4.1: according to an aggregation key $k_a$ in the system public key PK and an identity attribute O of the system public key PK, obtaining, by the o-th notary, a query token $td_o$ by using a token generation algorithm KASE.Trapdoor($k_a$, o) of the key aggregation searchable encryption, and sending the query token $td_o$ to the blockchain;

after receiving the query token $td_o$, obtaining, by a smart contract in the blockchain, an adjusted query token $td_o^{gid}$ by using an adjustment algorithm of the key aggregation searchable encryption;

according to the adjusted query token $td_o^{gid}$, obtaining, by the smart contract, the synthetic signature $\overline{\sigma_{N_j}}$ corresponding to the o-th notary by using a test algorithm of the key aggregation searchable encryption;

obtaining, by the o-th notary, the synthetic signature $\overline{\sigma_{N_j}}$ from the blockchain, and according to the identity attribute o, the decryption key dk and the user private key $usk_o$, obtaining a decrypted fragment $\sigma_{oj}^m$ of the message m by using a data partial decryption algorithm DTPKE.ShareDecrypt(dk,o,$usk_o$,$\overline{\sigma_{N_j}}$) of the dynamic threshold public key encryption;

encrypting, by the o-th notary, the decrypted fragment $\sigma_{oj}^m$ by using the public key $pk_l^{enc}$ of a trusted execution environment of the l-th tracer to obtain a synthetic signature fragment $\overline{uvk_{oj}}$, and sending the synthetic signature fragment $\overline{uvk_{oj}}$ to the blockchain;

step 4.2: receiving, by the l-th tracer, the synthetic signature fragment $\overline{uvk_{oj}}$ and the synthetic signature $\overline{\sigma_{N_j}}$ from the blockchain, decrypting the encrypted synthetic signature fragment $\overline{uvk_o}$ according to the private key $sk_l^{enc}$ of the trusted execution environment, to obtain the decrypted fragment $\sigma_{oj}^m$;

according to the encryption key ek, the notary set $N_j$ and the synthetic signature $\overline{\sigma_{N_j}}$, using, by the l-th tracer, a cipher text verification algorithm DTPKE.ValidateCT (ek,$N_j$,$\overline{\sigma_{N_j}}$) of the dynamic threshold public key encryption in the trusted execution environment to verify whether the synthetic signature $\overline{\sigma_{N_j}}$ is a valid encrypted cipher text of the notary set $N_j$ if so, outputting 1, otherwise, outputting 0;

according to the verification key vk, the identity attribute o of the o-th notary, the user version number $uvk_o$, the synthetic signature $\overline{\sigma_{N_j}}$ and a decryption fragment $\sigma_{oj}^m$, using, by the l-th tracer, a fragment verification algorithm of the dynamic threshold public key encryption in the trusted execution environment to verify whether the decrypted fragment $\sigma_{oj}^m$ is generated by the o-th notary, if so, outputting 1, otherwise, outputting 0;

according to the combined key ck, the notary set $N_j$, the synthetic signature $\overline{\sigma_{N_j}}$ and a decrypted fragment set $\{\sigma_{oj}^m\}_{o=1}^{t'}$, using, by the l-th tracer, a fragment combination algorithm DTPKE.Combine(ck,$N_j$,$\sigma_{N_j}$, $\{\sigma_{oj}^m\}_{o=1}^{t'}$) of the dynamic threshold public key encryption in the trusted execution environment to obtain the j-th aggregate signature $\sigma_j^m$ corresponding to the notary set $N_j$;

according to the public key pk, the message m and the j-th aggregate signature $\sigma_j^m$, using, by the l-th tracer, a traceability algorithm ATS.Trace(pk,m,$\sigma_j^m$) of the accountable threshold signature in the trusted execution environment to obtain the signature group S participating in signing the j-th aggregate signature $o_j^m$.

\* \* \* \* \*